United States Patent [19]
Work

[11] Patent Number: 5,437,105
[45] Date of Patent: Aug. 1, 1995

[54] CENTER FINDING DEVICE

[76] Inventor: Robert H. Work, 3558 Warren Rd., Cleveland, Ohio 44111

[21] Appl. No.: 189,597

[22] Filed: Jan. 31, 1994

[51] Int. Cl.$^6$ ............................................. G01D 21/00
[52] U.S. Cl. ....................................... 33/644; 33/520; 33/672; 33/673; 33/454
[58] Field of Search ................. 33/644, 1 F, 520, 670, 33/671, 672, 673, 674, 676, 452, 454, 456, 459, 460, 464

[56] References Cited

U.S. PATENT DOCUMENTS

| | | | |
|---|---|---|---|
| 688,061 | 12/1901 | Bustanoby | 33/454 |
| 1,255,507 | 2/1918 | Brennan | 33/673 |
| 1,357,462 | 11/1920 | Lund | 33/454 |
| 1,410,196 | 3/1922 | Krivacs | 33/520 |
| 4,084,325 | 4/1978 | Jones, Jr. | 33/670 |

FOREIGN PATENT DOCUMENTS 832308 5/1981 U.S.S.R. ................. 33/670

*Primary Examiner*—Christopher W. Fulton
*Attorney, Agent, or Firm*—Howard M. Cohn

[57] ABSTRACT

A center finding device for locating the geometric center of a workpiece having substantially parallel side surfaces including a pair of crossed arm members pivotally secured to each other by a tubular member with a marking pin received therein and secured at one end and in slidable-pivotal relation to a longitudinal slot in each of a pair of side guide arms whereby when the guide arms are moved into engaging relation with the parallel side surfaces of the workpiece, the crossed arm members are automatically slidable into a position with the tubular member being in a geometrically centered position with respect to the workpiece. In addition, the center finding device can be used in conjunction with an accessory for locating the geometric center of a workpiece having substantially non-parallel side surfaces.

6 Claims, 1 Drawing Sheet

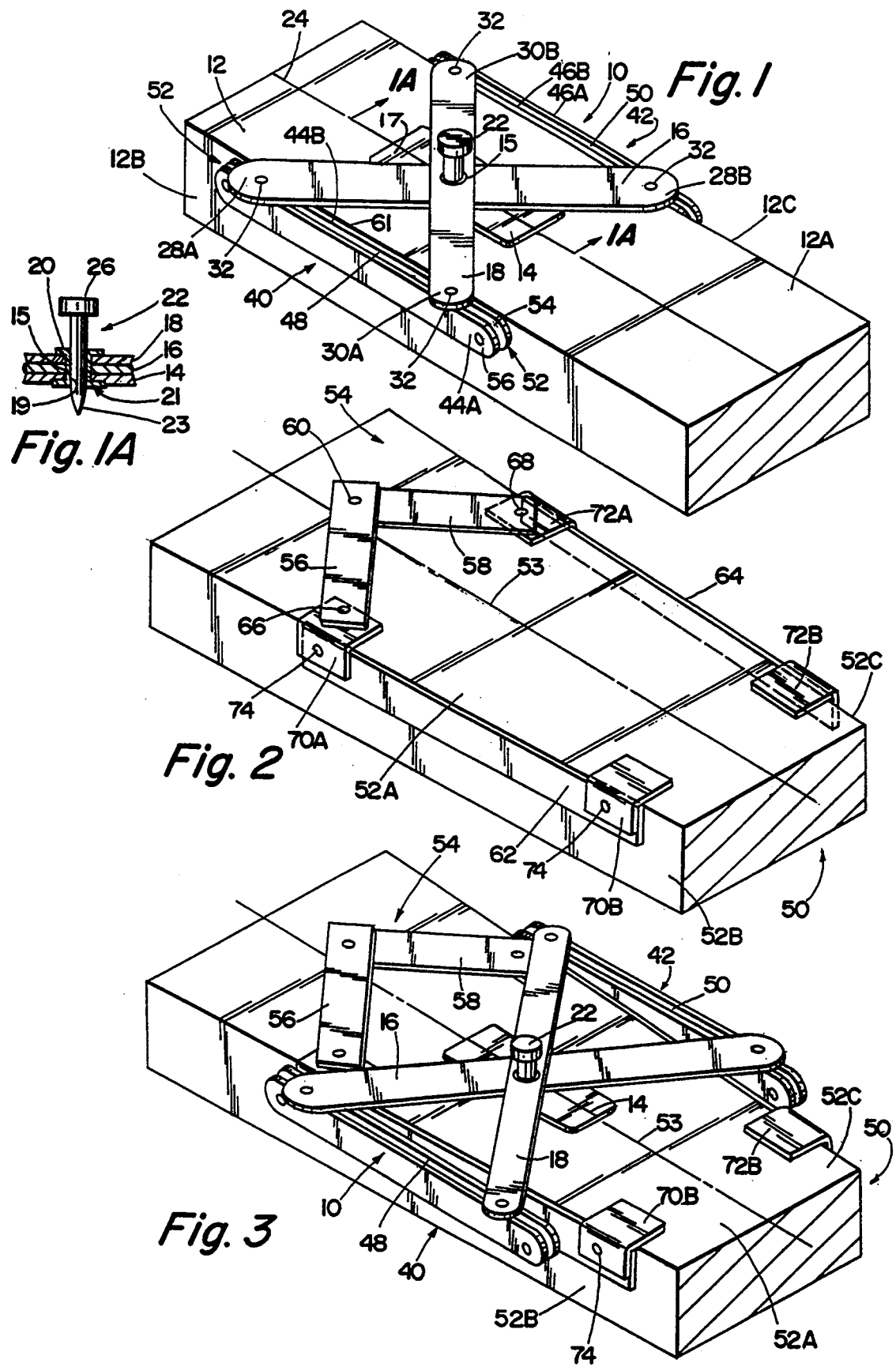

CENTER FINDING DEVICE

FIELD OF THE INVENTION

This invention relates to a center finding device for finding the center of a workpiece. More particularly, the invention relates to a center finding device for use by itself to scribe the center of a workpiece having parallel sides or in conjunction with an accessory to scribe the center of a workpiece with non-parallel sides.

BACKGROUND OF THE INVENTION

While there have been many and some rather complex devices for finding the center of workpieces, there is still a need for a device of relatively simple construction which can be positioned to locate the center of workpieces having parallel or non-parallel sides. Also, the device should be capable of scribing the center of the workpiece and in scribing a median or center line of the workpiece.

SUMMARY OF THE INVENTION

It is an object of the present invention to find the center of a workpiece with parallel or non-parallel sides with a device which obviates the problems and limitations of the prior art devices.

It is a further object of the present invention to provide a center finding device for accurately and quickly determining the geometric center of a workpiece, such as a strip of lumber.

It is a still further object of the present invention to provide a center measuring device for use in conjunction with a scribing instrument which can both mark the center point of the workpiece as well as the median or center line of the workpiece.

It is a still further object of the present invention to provide a center measuring device which is capable of determining and scribing the center of a workpiece having non-parallel sides.

In accordance with the invention, there is provided a center finding device for locating the center of a workpiece having substantially parallel side surfaces. The device has a base plate and a pair of crossed arm members pivotally secured to each other by a tubular member at a midpoint between opposite ends of the arm members. The pair of arm members are each secured at either end to a longitudinal slot in each of a pair of side guide arms in slidable-pivotal relation thereto whereby when the side guide arms are moved into engaging relation with the parallel side surfaces of the workpiece, the pair of crossed arm members are automatically slidable into a position with the tubular member being in a geometrical centering position on the upper surface of the workpiece. Means, such as a scribing pin, can be inserted into within the tubular member for marking the center of the workpiece.

Also in accordance with the invention, a center finding assembly for locating the center of a workpiece having substantially non-parallel side surfaces includes an accessory having a pair of connecting arms pivotally connected to each other at their inner ends and pivotally connected at their outer ends to a pair of side engaging leg members whereby the pair of side engaging leg members are movable into engaging relation with the non-parallel side surfaces of the workpiece. The leg members each have protrusions, such as screw or rivet heads projecting outward therefrom at opposite ends thereof. The center finding device is then mounted to the accessory whereby when the pair of side guide arms are firmly pressed into engaging relation with the protrusions at one end of the pair of side engaging leg members, the pair of crossed arm members are automatically slidable into a position with the tubular member being in a geometric centering position on the workpiece.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 1 is a perspective view of a center finding device illustrating the manner in which the same can be applied in determining and indicating the geometric, center of a workpiece having parallel sides;

FIG. 1A is a view, partly in cross-section, of a centering and scribing pin mounted within a tubular member pivotally securing the cross arms and base member of the center finding device illustrated in FIG. 1;

FIG. 2 is a perspective view of an accessory used in conjunction with the centering device of FIG. 1 to mark the geometric center of a workpiece having non-parallel sides; and FIG. 3 is a perspective view of the accessory of FIG. 2 and the centering device of FIG. 1 mounted on a workpiece having non-parallel sides.

DETAILED DESCRIPTION OF THE INVENTION

Referring to FIG. 1, a center finding device 10 is shown mounted on a workpiece 12, typically a strip of lumber, having an upper surface 12A, and substantially parallel side surfaces 12B and 12C. The center finding device 10 generally includes a centrally disposed, base plate 14 which is pivotally secured by a tubular member 15 to a pair of substantially identical, crossed arm members 16 and 18 that extend radially outward from tubular member 15. The base plate can have a scribe line 17. Tubular member 15 has a central opening 19 and collars 20 and 21 at either end which secure the arm members 16 and 18 to base plate 14 so as to securely hold arm members 16 and 18 in assembled relation to the base plate and permit relative angular movement of the arm members 16, 18 to each other and to base plate 14.

Freely slidably fitted in the tubular member 15 is a combined centering and scribing pin 22 having a conical pointed end 23 designed to be pressed into the workpiece to indicate the center thereof or to mark a line upon the workpiece when it is desired to determine and indicate a median or center line 24 thereof. Pin 22 includes a head 26 adapted for pressing the pin into the workpiece either manually or with a tool such as a hammer, as desired. While a pin 22 is illustrated, it is also within the scope of the present invention to insert a marking device such as a pen or pencil within the central opening 19 through tubular member 15.

Opposite ends 28A, 28B and 30A, 30B of arms 16 and 18, respectively, are secured by pin means 32, such as a nut and bolt or a rivet, in slidable-pivotal relation to a pair of first and second side engaging guide arms 40 and 42 whereby the side guide arms are movable into engaging relation with the parallel side surfaces 12B and 12C, respectively, of workpiece 12. The first and second side engaging guide arms 40 and 42 are substantially identical and can be constructed of pairs of elongated guide members 44A, 44B and 46A, 46B, respectively, which are in spaced relation to each other to form longitudinal slots 48 and 50, respectively. The opposite ends of side guide arms 40 and 42 are connected by a fastener 52, such as a tubular member 54 with a fastening pin 56 such as a rivet or nut and bolt extending therethrough and secured at opposite ends to the spaced guide members.

When employing the device 10 in a manner to locate a geometric center or mark the median or center line of workpiece 12, as shown in FIG. 1, the base plate 14 is placed against the upper surface 12A of workpiece 12 and the side guide arms 40 and 42 are pressed against the opposing parallel side surfaces 12B and 12C of the workpiece 12 causing the arm members 16 and 18 to move with respect to each other and the base plate 14 so that in all positions of adjustment of device 10, the tubular member 15 is equidistantly spaced from sides 12B and 12C of workpiece 12. Then, pin 22 is pressed downwards so that its conical point 23 scribes a mark on the geometric center of workpiece. When desired, the operator can move device 10 along the length of workpiece 12 with the side guide arms 40 and 42 pressed against parallel sides 12B and 12C, respectively, to scribe a centerline 24 as shown in FIG. 1.

When a center is to be market at a location along a line spaced from an end of the workpiece, the base plate 14 can be turned to a transverse position from that illustrated in FIG. 1 so that scribe line 17 lines up with the marked spaced line across the workpiece. Then the scribe pin is pressed into the workpiece at the geometric center as previously discussed. Moreover, the components of device 10 can be constructed of any material, typically metal or plastic. When the base plate is of a clear plastic, the scribe line 17 can be easily aligned with a spaced line across the workpiece.

With a workpiece 50 having an upper surface 52A and non-parallel sides 52B and 52C, as shown in FIGS. 2 and 3, an accessory 54 can be used in conjunction with device 10, as shown in FIG. 3, to scribe the geometric center or mark the center line 53 through workpiece 50. Accessory 54 includes a pair of connecting arms 56 and 58 pivotally connected at their inner ends to each other, by means such as a rivet 60. The opposite ends of arms 56 and 58 are pivotally connected to side engaging leg members 62 and 64, by means such as a rivet at 66 and 68, respectively. At either end of leg member 62 and 64 are L-shaped brackets 70A, 70B and 72A, 72B, respectively which are fixedly secured thereto, by means such as a screw or rivet having a protruding head 74 which acts as a fulcrum point for reasons as discussed below.

When employing the accessory 54 in conjunction with the center-finding device 10, as shown in FIG. 3, accessory 54 is initially mounted on workpiece 50 with the L-shaped brackets 70A, 70B and 72A, 72B engaged against the upper surface 52A and non-parallel sides 52B, 52C of the workpiece, generally as shown in FIG. 2. Preferably, the L-shaped brackets 70A and 72A are aligned to be diametrically across from each other with respect to the location where the center point is to be inscribed. Then, center finding device 10 is placed over accessory 54 so that the ends of guide arms 40 and 42 are firmly pressed against the protruding head 74 of each L-shaped bracket 70A and 72A which act as fulcrum points so that leg members 62, 64 are held tightly against sides 52A, 52B and guide arms 40, 42 are secured in a position with tubular member 54 equidistantly spaced from sides 52A and 52B. Then pin 22 can be pressed through tubular member 54 to mark the geometric center of workpiece 50. Note that when center finding device 10 is secured against accessory 54, a space is created between the opposite ends of guide arms 40 and 42 and leg members 62 and 64. While accessory 54 is shown pressed against brackets 70A and 72A, it can also be pressed against the protrusions 74 on brackets 70B and 72B or simply against leg members 62 and 64. After the accessory 54 and the device 10 are assembled in either of the latter positions, pin 22 can be pressed into the workpiece 50 to scribe a center position along centerline 53 on the upper surface 52A.

It is apparent that has been provided in accordance with this invention apparatus for finding the center of a workpiece having parallel or non-parallel sides that satisfies the objects, means, and advantages set forth herein before. According to the invention, the center finding device is mounted onto a workpiece to mark the center point of the workpiece as well as the median or center line of the workpiece. An accessory is provided for use in conjunction with the center finding device to locate the center of a workpiece having non-parallel sides.

While the invention has been described in combination with embodiments thereof, it is evident that many alternatives, modifications, and variations will be applied to those skilled in the art in light of the foregoing teachings. Accordingly, the invention is intending to embrace all such alternatives, modifications and variations as fall within the spirit and scope of the appending claims.

I claim:

1. A center finding assembly for locating the center of a workpiece having substantially non-parallel side surfaces, comprising:

an accessory including a pair of connecting arms pivotally connected to each other at their inner ends and pivotally connected to first and second side engaging leg members at their outer ends whereby said first and second side engaging leg members arms are movable into engaging relation with said non-parallel side surfaces of said workpiece; and a center finding device having:

first and second crossed arm members pivotally secured to each other by a tubular member at a midpoint between opposite ends of each of said first and second arm members;

first and second side guide arms each having elongated longitudinal slots; and means for securing one end of each of said first and second arm members to said longitudinal slot of said first guide arm in slidable-pivotal relation thereto and for securing an opposite end of each of said first and second arm members to said longitudinal slot of said second guide arm in slidable-pivotal relation thereto whereby when said first and second side guide arms are movable into engaging relation with said first and second side engaging leg members, said first and second crossed arm members are automatically slidable into a position with said tubular member being in a geometrically centered position with respect to said upper surface of said workpiece.

2. The center finding assembly of claim 1 wherein said accessory includes bracket means with protrusions projecting therefrom fixedly secured to opposite ends of said first and second side engaging leg members whereby said guide arms of said centering device can pivot about the protrusions which act as fulcrums while forcing said first and second side leg members into engaging relation with said non-parallel sides of said workpiece.

3. The center finding assembly of claim 2 wherein said bracket means includes L-shaped brackets which are secured to opposite ends of said side engaging leg members which are adapted for gripping engagement with said upper surface and said non-parallel side surfaces of said workpiece.

4. The center finding device of claim 1 further including means adapted to be inserted within said tubular member for marking the geometric center of said upper surface of said workpiece.

5. The center finding device of claim 1 further including a base plate pivotally secured by said tubular member to said first and second crossed arm members.

6. The center finding device of claim 1 including pin means for securing said ends of each of said first and second arm members to said longitudinal slots in said first and second guide arms in slidable-pivotal relation thereto.

* * * * *